(12) United States Patent
Lee

(10) Patent No.: US 6,343,806 B1
(45) Date of Patent: Feb. 5, 2002

(54) BICYCLE HEAD SET ASSEMBLY

(76) Inventor: Qun-Yuan Lee, No. 33, Lane 486, Sanfeng Road, Fengyuan City, Taichung (TW)

(*) Notice: Subject to any disclaimer, the term of this patent is extended or adjusted under 35 U.S.C. 154(b) by 0 days.

(21) Appl. No.: 09/819,746

(22) Filed: Mar. 29, 2001

(51) Int. Cl.[7] .......................... B62K 19/32; B62K 21/06
(52) U.S. Cl. ...................................... 280/272; 280/279
(58) Field of Search ........................ 280/272, 271, 280/279, 276, 280, 89

(56) References Cited

U.S. PATENT DOCUMENTS

| | | | | |
|---|---|---|---|---|
| 469,626 A | * | 2/1892 | Copeland | 280/272 |
| 582,279 A | * | 5/1897 | Gold | 280/272 |
| 2,511,320 A | * | 6/1950 | Benson | 280/272 |
| 5,516,133 A | * | 5/1996 | Motrenec et al. | 280/272 |
| 5,927,740 A | * | 7/1999 | Hopey | 280/272 |

* cited by examiner

Primary Examiner—Anne Marie Boehler
(74) Attorney, Agent, or Firm—Rosenberg, Klein & Lee

(57) ABSTRACT

A bicycle head set assembly includes a threaded steerer tube extending through a head tube and a collar is mounted to the steerer tube 61 and securely mounted to a top of the head tube. Two lugs extend radially outward from the collar and a ring is mounted to the steerer tube. The ring has a skirt with two protrusions extending therefrom and a bearing is retained between the skirt and the collar. A locking nut is threadedly connected to the steerer tube and compresses the ring to position the bearing. A handlebar is connected to the steerer tube. The range of rotation of the handlebar is limited when the protrusions are rotated to contact the lugs.

2 Claims, 3 Drawing Sheets

BICYCLE HEAD SET ASSEMBLY

FIELD OF THE INVENTION

The present invention relates to a head set assembly for a bicycle and includes a ring having protrusions and a fixedly collar having lugs so that the steerer tube is stopped at 180 degrees when the protrusion contacts the lug.

BACKGROUND OF THE INVENTION

A conventional bicycle head set is connected to each of the two ends of a head tube and a steerer tube of the front fork extends through the head tube and the two head sets are mounted to the sterer tube. The handlebar assembly is connected to the steerer tube so that the handlebar can be rotated freely. Nevertheless, there is a potential shortcoming that when the handlebar is rotated over 180 degrees, the front wheel is rotated to be transverse to a forward direction and if the bicycle is at a certain speed, the rider will definitely fall because the front wheel looses its rotation feature. Besides, when the handlebar is rotated over 180 degrees, the brake cables having limited length will be pulled and brake the bicycle suddenly.

The present invention intends to provide a head set assembly that allows the handlebar to be rotated within desired range.

SUMMARY OF THE INVENTION

In accordance with one aspect of the present invention, there is provided a bicycle head set assembly and comprises a steerer tube having threads defined in an outer periphery thereof and extending through a head tube. A collar and a ring are respectively mounted to the steerer tube with a bearing retained between the collar and the ring. Two lugs extend radially outward from the collar and the ring has a skirt from which two protrusions extend. A locking nut is threadedly connected to the steerer tube and compresses the ring to position the bearing. A handlebar is connected to the steerer tube.

The primary object of the present invention is to provide a bicycle head set that limits the handlebar to be rotated within a desired range of angles.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
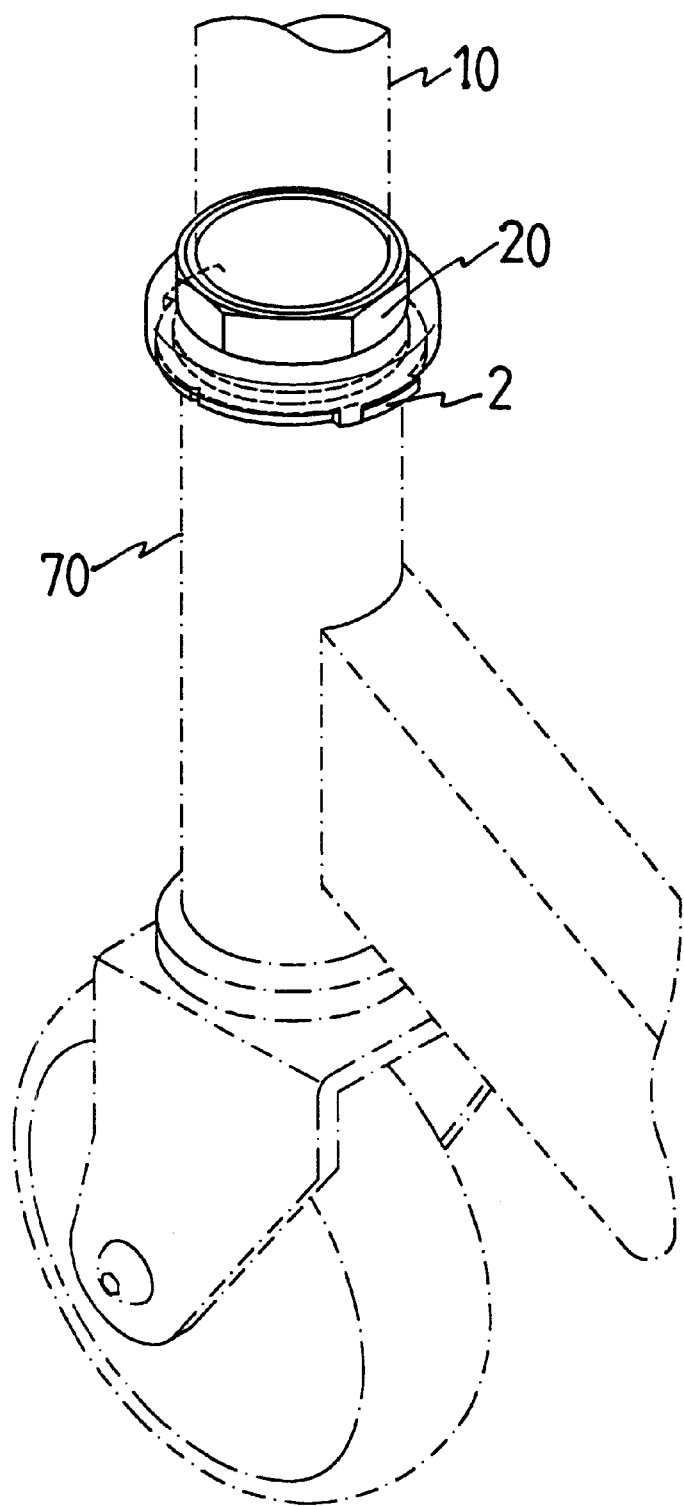
FIG. 1 is a perspective view to show the bicycle head set assembly of the present invention.
Figure 2:
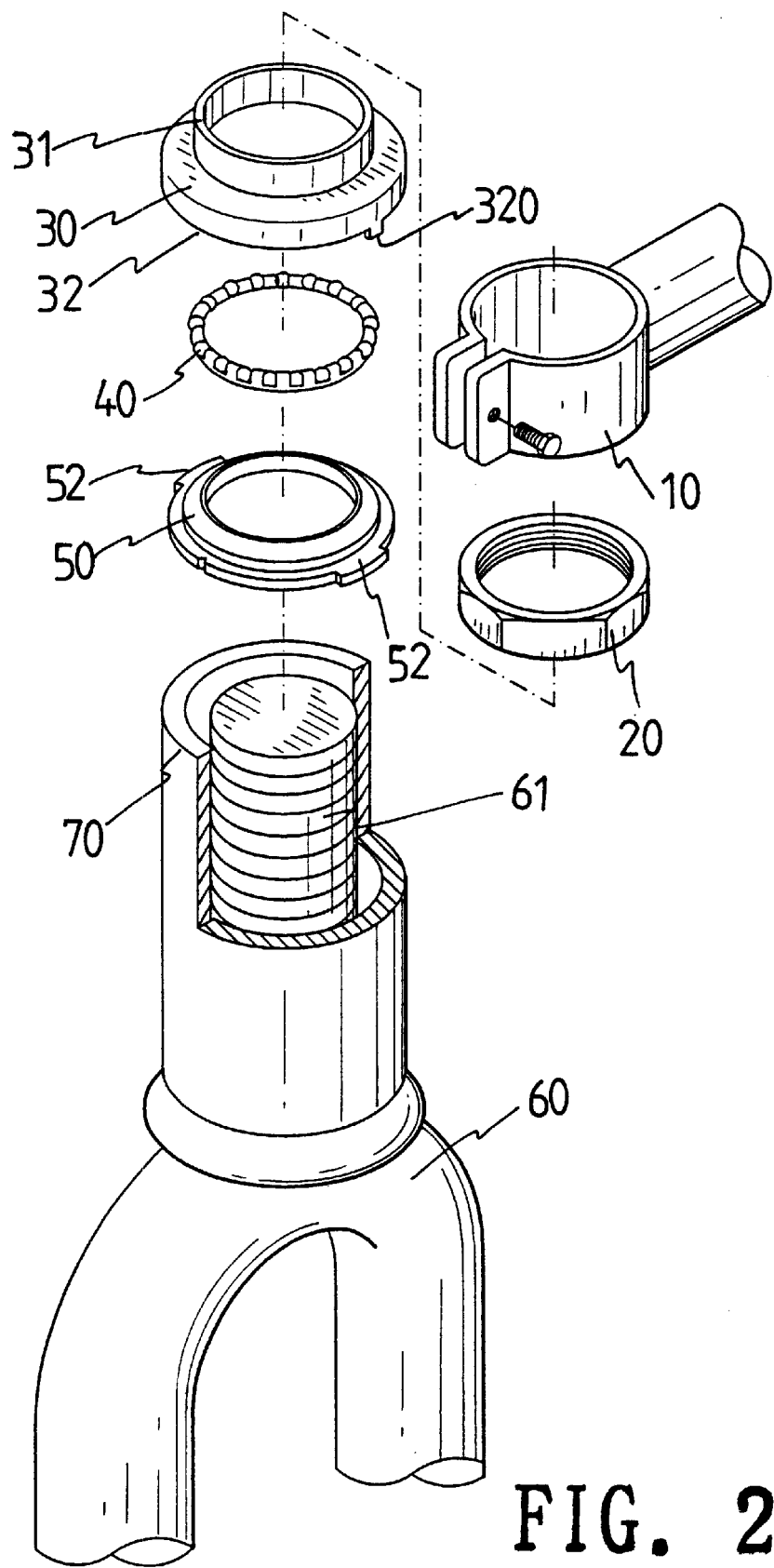
FIG. 2 is an exploded view to show the bicycle head set assembly of the present invention.

Referring to FIGS. 1 and 2, the bicycle head set assembly of the present invention comprises a steerer tube 61 having threads defined in an outer periphery thereof and extending through a head tube 70 of the bicycle. A collar 50 is mounted to the steerer tube 61 and securely mounted to a top of the head tube 70. Two lugs 52 extend radially outward from the collar 50 and a ring 30 is mounted to the steerer tube 61 and has a skit 32. A bearing 40 is retained between the skirt 32 and the collar 50. Two protrusions 320 extend from the skirt 32 and the steerer tube 61 extends through the collar 50 and the ring 30. A neck 31 extends from the ring 30.

A locking nut 20 is threadedly connected to the steerer tube 61 and contacts on the neck 31 so as to compress the ring 30 downward to position the bearing 40. A handlebar 10 is connected to the steerer tube 61.

Figure 3:
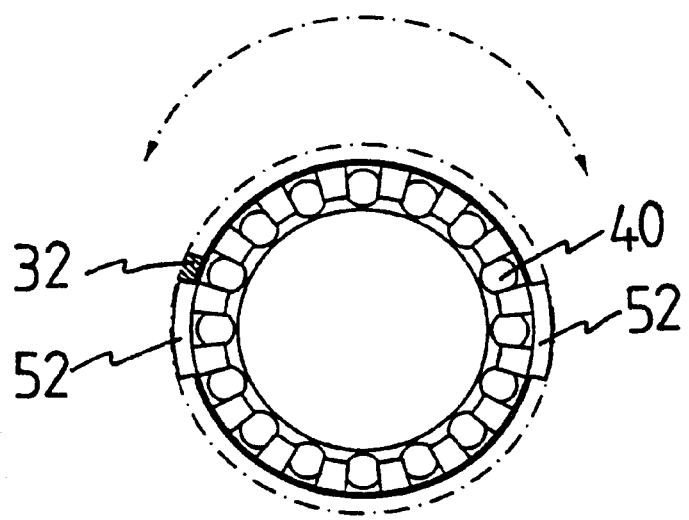
FIG. 3 is a top plan view to show the protrusion on the ring is located contacting the left lug on the collar.
Figure 4:
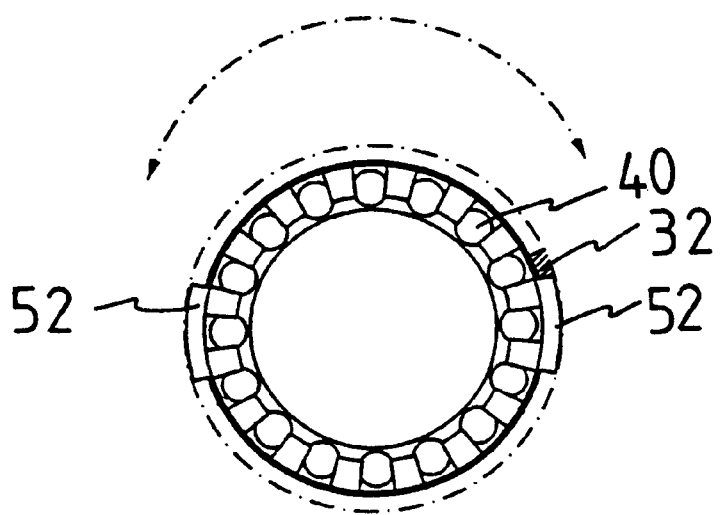
FIG. 4 is a top plan view to show the protrusion on the ring is located contacting the right lug on the collar.

Referring to FIGS. 3 and 4, when rotating the handlebar 10, the ring 30 is co-rotated with the handlebar 10 and the two protrusions 320 are moved till they contact the lugs 52 on the collar 50. Accordingly, the range of rotation of the ring 30 and the handlebar 10 is limited by the lugs 52.

While we have shown and described the embodiment in accordance with the present invention, it should be clear to those skilled in the art that further embodiments may be made without departing from the scope of the present invention.

What is claimed is:

1. A bicycle head set assembly comprising:

a steerer tube having threads defined in an outer periphery thereof and extending through a head tube;

a collar mounted to said steerer tube and securely mounted to a top of said head tube, two lugs extending radially outward from said collar, a ring mounted to said steerer tube and having a skirt, a bearing retained between said skirt and said collar, two protrusions extending from said skirt, said steerer tube extending through said collar and said ring, and a locking nut threadedly connected to said steerer tube and compressing said ring to position said bearing, a handlebar connected to said steerer tube.

2. The device as claimed in claim 1 further comprising a neck extending from said ring and said locking nut contacting against said neck.

* * * * *